United States Patent [19]

Mitchell et al.

[11] Patent Number: 4,648,761

[45] Date of Patent: Mar. 10, 1987

[54] MACHINING METHOD

[75] Inventors: Robert N. Mitchell; James L. Hunt, both of Raleigh, N.C.

[73] Assignee: Kennemetel, Inc., Latrobe, Pa.

[21] Appl. No.: 797,768

[22] Filed: Nov. 14, 1985

Related U.S. Application Data

[63] Continuation of Ser. No. 595,375, Mar. 30, 1984, abandoned.

[51] Int. Cl.⁴ .................... B23P 13/02; B23C 3/00
[52] U.S. Cl. .................................... 29/558; 409/132
[58] Field of Search .................... 409/131, 132, 84; 408/42; 29/558, 557; 144/69

[56] References Cited

U.S. PATENT DOCUMENTS 2,376,724  5/1945  Rice ........................... 29/558
4,137,003  1/1979  Budoff ....................... 144/69 X
4,337,566  7/1982  Di Matteo et al. .......... 409/131

FOREIGN PATENT DOCUMENTS 82135  7/1981  Japan ......................... 408/42

Primary Examiner—William R. Briggs
Attorney, Agent, or Firm—John J. Prizzi

[57] ABSTRACT

A method of efficiently removing material from a workpiece of difficult-to-machine materials. The Z axis machining includes the steps of using a center cutting end mill and forming multiple cylindrical holes having tangent diameters and predetermined depths. Said holes, when formed, leave posts that, when viewed in plan, form stars and cusps. Said stars are then removed by reciprocal movement of said end mill along its Z axis and cusps removed by Z axis machining and/or conventional end milling.

4 Claims, 5 Drawing Figures

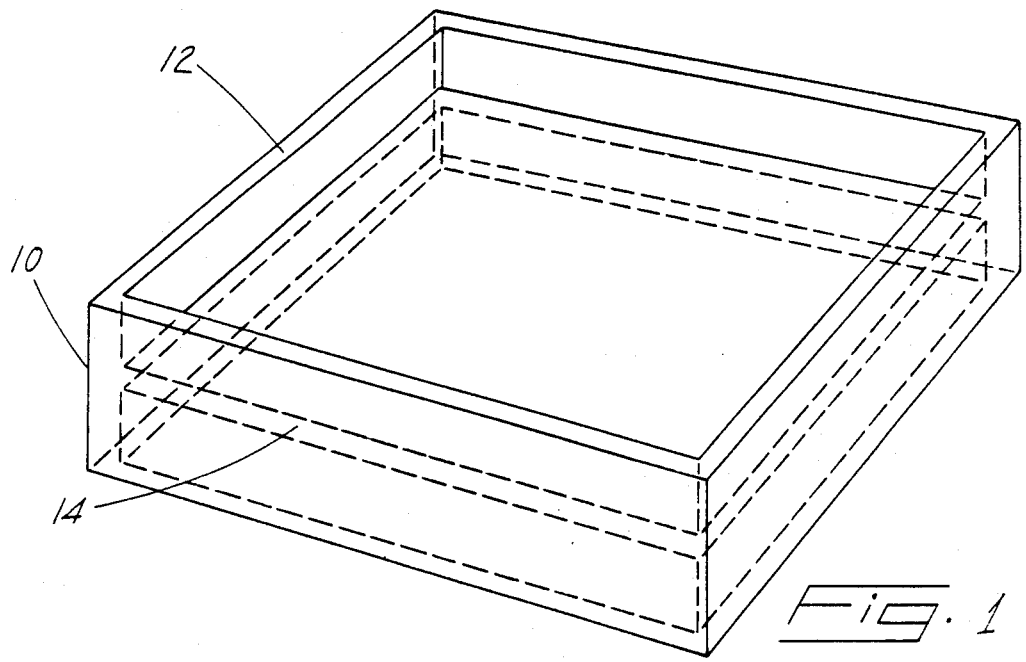
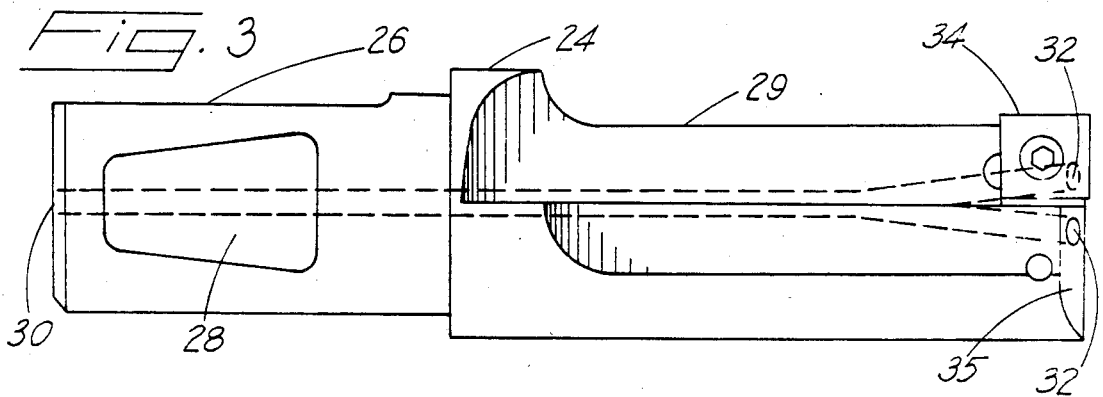
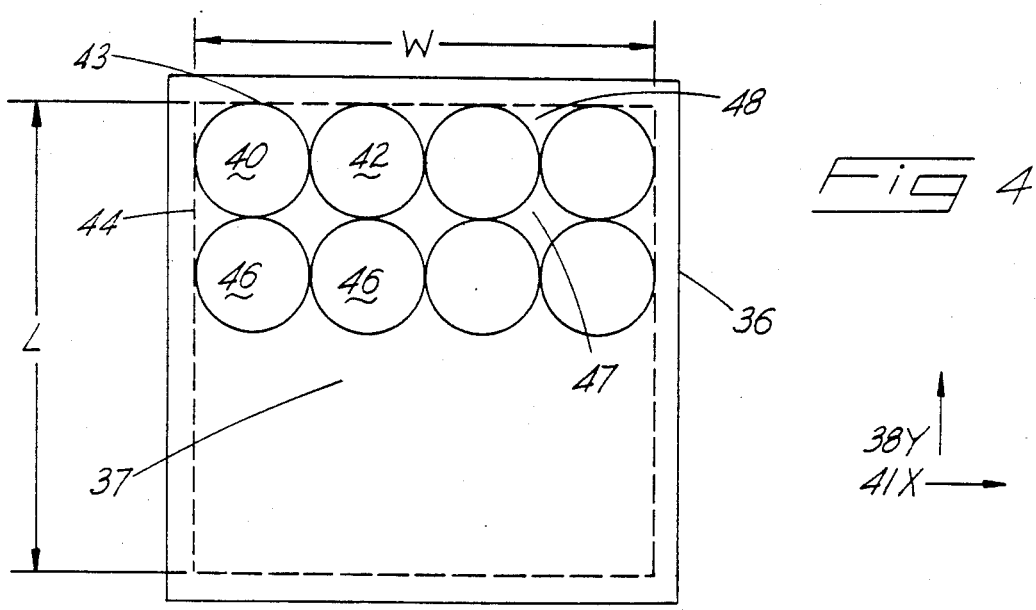

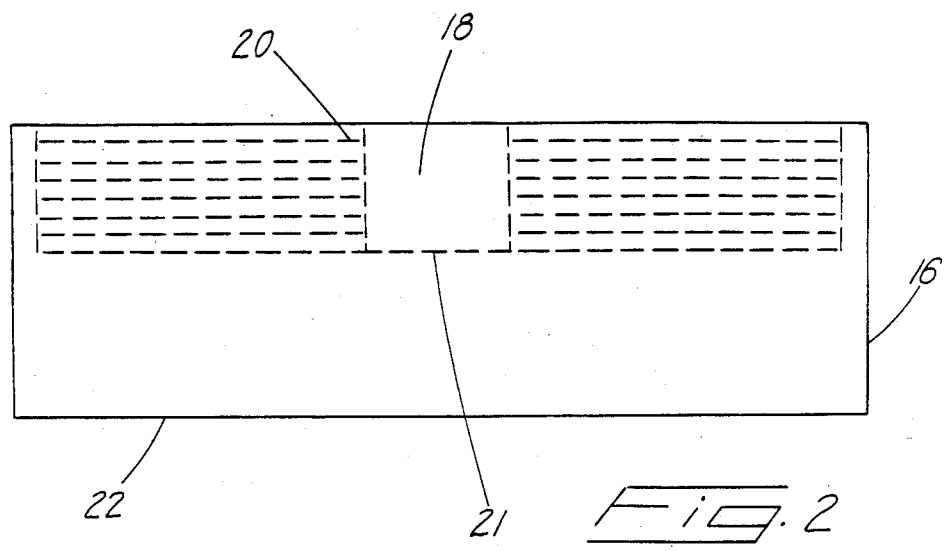
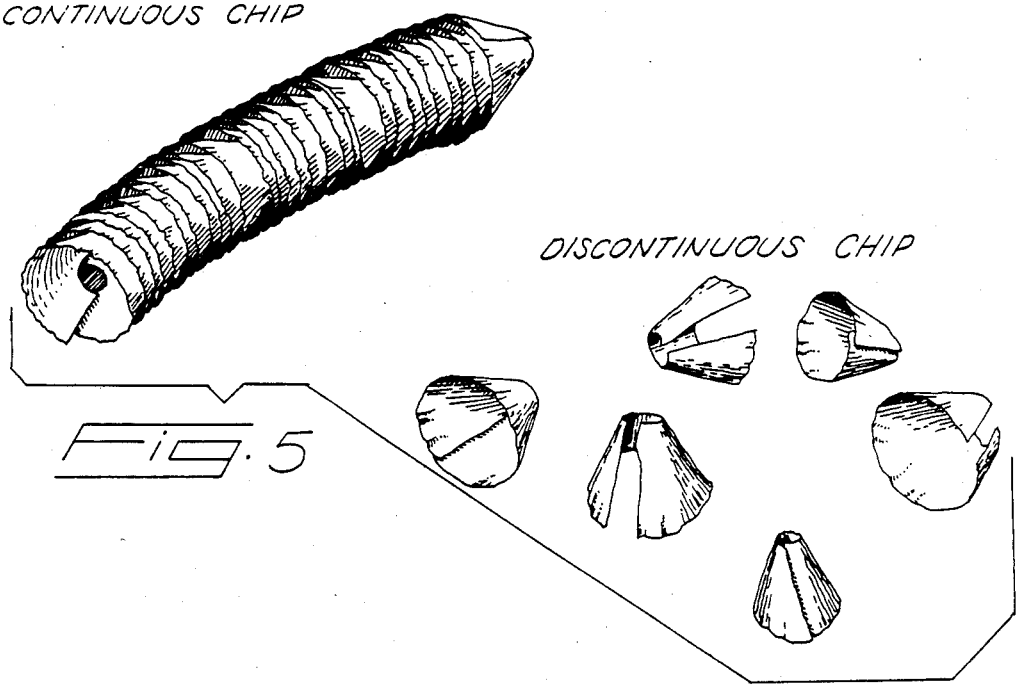

MACHINING METHOD

This application is a continuation of application Ser. No. 595,375, filed Mar. 30, 1984, now abandoned.

BACKGROUND OF THE INVENTION

This invention concerns tools used to remove a volume of material from a workpiece and is especially concerned with the use of center cutting end mills for forming contours in titanium materials.

Materials such as titanium have relatively light weight and great strength and, for that reason, are used in structural and operating parts for aircraft. Structural parts for aircraft, when made from titanium, must be thin in cross section while having flanges perpendicular to said cross sections. In order to manufacture such parts having thin cross sections from titanium, it is necessary to machine said parts out of solid blocks of stock. This usually requires that more titanium material be removed from the block than will remain in the workpiece.

To date, the method used in removing the titanium has been using a drill to make a cylindrical access hole with a predetermined depth in the pocket to be formed in the titanium. End mills are then lowered to a fraction of the depth of the access hole and traversed over an x and y axis until the entire surface of the pocket to be formed is traversed. The method is again repeated until each fraction of depth of cut totals the required part print depth.

The problem with the above procedure is that it is extremely time consuming, and the cutting edges of the end mills are easily and very often damaged. The cause of the damage usually is due to the cutting edge recutting an already machined chip.

When the cutting edge of the end mill encounters a previously machined chip, it can cause systems deflection and damage itself. When utilizing carbide instead of H.S.S. material in the drill or end mill, the carbide cutting edge can also be damaged when a previously machined chip is caught between the cutting edge and the uncut material.

BRIEF SUMMARY OF THE INVENTION

According to the present invention, disclosed herein is a method of removing material from a workpiece, especially a titanium alloy workpiece, to form a rectangular or square configuration which includes the steps of forming individual cylindrical holes having a predetermined depth in a workpiece and positioning said holes along the length and width of the rectangle or square contour so that portions of their diameters are tangent with at least portions of the diameter of two other holes in the surface of the workpiece. Once these holes are placed within the boundaries of the rectangle or square, posts or cusps will be formed which are bounded by portions of the tangent diameters of said holes. The completed rectangle or square contour may then be finished by removing the posts and cusps from the workpiece by an end milling technique.

Further, the method specifically concerns the reciprocal movement of a center cutting end mill along its Z axis to form a single cylindrical hole, and when repositioned in its starting position, moving it along its x or y axis a distance equal to a multiple of its diameters, and then reciprocally machining another Z axis hole.

BRIEF DESCRIPTION OF THE DRAWINGS

The exact nature of the present invention will become more clearly apparent upon reference to the following detailed specification taken in connection with the accompanying drawings in which:

FIG. 1 is a sectional view of a typical structural part.

FIG. 2 is a side sectional view from a blovk of material necessary to create the part in FIG. 1.

FIG. 3 is the center cutting end mill used with the method of the present invention.

FIG. 4 is a plan view of the block shown in FIG. 2 and being prepared by the method of the present invention.

FIG. 5 shows typical continuous and discontinuous type chips.

DETAILED DESCRIPTION OF THE INVENTION

Referring to the drawings somewhat more in detail, what is shown in FIG. 1 is a typical titanium structural part found as part of an aircraft structural system.

The structural part 10 resembles a four-sided box with walls 12 and a thin cross sectional area 14. The thin cross sectional area 14, in some cases, may only be as much as 0.050 to 0.100 inches thick, with the thickness of walls 12 being approximately the same.

When the part 10 is made of titanium in order to achieve the configuration shown in FIG. 1, special procedures must be used. Specifically, shown in FIG. 2 is a piece of stock 16 from which the strucutral part 10 may be fabricated. Presently, part 10 is constructed by, first, sinking a hole 18 to the depth required to create an end mill access hole. Next, an end mill is lowered to depth 20 in the access hole 18, and the end mill is then transversed over its x and y coordinates until it covers the surface area necessary to create top half of part shown in FIG. 1. The end mill will then be lowered another fractional part of the depth of hole 18, and the entire surface area will be again transversed.

This procedure will be repeated continuously until the bottom 21 of the hole 18 is reached. The part will then be turned over and the same procedure applied to the lower side 22 so as to create part shown in FIG. 1.

As a part of the present invention, a special tool has been created, pictured in FIG. 3. The tool 24 has a shank 26 with a whistle notch type configuration, as shown at 28, for attachment to a rotary power source. The tool is similar to pre-existing center cut end mills, except that its forward section 29 has been elongated so as to be able to create the depth of hole necessary for the particular part to be machined.

The tool also has a center hole 30 which supplies the coolant through the shank 26 and out end faces 32 so as to cool and flush the chips as they are generated from the workpiece. The inserts 34 are mounted on the tool. The inserts used particularly have a sharp edge rather than any honed or preground edge. A relief 35 is provided behind the second mounted insert 34, not shown.

Since safety is of utmost concern to the metalcutting industry, this method produces cool, safe chips which are generated at conservative cutting feeds and speeds. The inherent fire hazard of titanium is significantly reduced because the chip is formed at low surface speed per minute (S.P.M.) and in a coolant induced environment.

While this invention has been used for the processing of titanium, it is thought that, if one were to advance to the machining of other materials, the cutting edge may be honed rather than sharp.

What is shown in FIG. 4 is a plan view of a piece of stock 36 from which will be made the typical part as shown in FIG. 1. It has now been proven that the center cutting end mill 24 is most preferably designed to have a diameter which is a multiple of the width and length of the cavity 37. When the end mill 24 is so designed, material from the part may be removed most efficiently by maneuvering the tool reciprocally in the Z axis direction. The Z axis direction, according to FIG. 4, would be facing into the paper.

The x and y axes are shown as indicated at 38 and 41. It is most desirable that the end mill 24 be positioned at the necessary x and y coordinates so as to start by drilling hole 40. Hole 40 necessarily has portions of its diameter tangent to the sides 43 and 44 of part 36.

Producing hole 40 may require the center cut end mill to instantaneously pause its feed at certain intervals during its engagement with the workpiece so as to break the chip being formed. This will be required when the chip type is continuous in formation, and it may not be required if the chip type is discontinuous during formation (see FIG. 5).

Once hole 40 is created by reciprocally moving the end mill 24 in the Z axis direction, it may then, when in the up position, be moved in the direction so that reciprocal motion in the Z axis will create hole 42. The end mill 24 may then again be raised, and by repositioning the tool in the x and y coordinate directions, multiple holes may be created that fit within the boundaries of the width and length of part 36.

When created, the holes 40, 42 and typical holes 46, will have portions of their diameters that are cotangent with portions of the diameters of adjacent holes.

When the entire plan view of part 36 has been machined with the necessary holes 40, 42 and 46, what will be left are the posts 47 which will be in the form of a star when viewed in a plan view and the cusps 48 formed along the peripheral boundary of the part 36.

Preferably, the next step according to the present invention is to position the end mill 24 along the x and y coordinates so that it rests along the Z axis immediately above the remaining posts 47. Reciprocal movement along the Z axis again does away with posts 47, and this step must be repeated for every post that remains as a star in the plan view of FIG. 4.

Cusps 48 are then removed by the normal techniques of lowering an end mill along the Z axis until it reaches the correct depth and then transversing the x and y coordinates so as to form the necessary boundaries and-/or using the Z axis machining method to remove the cusps.

One of the reasons it is believed that tool life is enhanced immensely over the procedures of the prior art concerns the cotangency points shown in FIG. 4 of multiple holes 40, 42 and 46. When a tool is rotating in a hole, there is always the possibility that an already hardened and precut chip can get caught between the wall and the cutting edge of the tool. When this occurs, the cutting edge of the tool, whether it be high speed steel or carbide, is chipped, thereby diminishing the effective life of the tool. In the present case, when such an occurrence happens, the chip merely deflects the thin walls of the holes at the cotangency points, thereby lessening the damage to the cutting edge of the tool.

Two additional reasons it is believed that tool life is enhanced immensely over the procedures of the prior art concern the minimizing of systems deflection and elimination of the tangential impacts of end milling. The machine tool life should also be extended because the Z axis force does not impose the spindle bending forces of peripheral end milling, but imparts Z axis force in the direction of strength of the machine tool system.

Modifications may be made within the scope of the appended claims.

What is claimed is:

1. The method of removing material from a workpiece which comprises the steps of: forming cylindrical holes having a predetermined depth in a workpiece; positioning said holes so that portions of their circumferences are tangent with at least portions of the circumferences of two other holes in the surface of the workpiece; forming posts or cusps bounded by portions of the tangent diameters of said holes; removing said posts and cusps from the workpiece; reciprocally moving a center cutting end mill along its z axis to form said holes and to remove said posts.

2. The method according to claim 1 which further comprises reciprocally moving said center cutting end mill along its Z axis to form one of said holes and repositioning said end mill along its x or y axis a distance substantially equal to a multiple of its diameters and machining another one of said holes.

3. The method according to claim 2 which further comprises having said end mill instantaneously pause its feed at certain intervals during its engagement with the workpiece so as to break the chip as required of the material being removed.

4. The method according to claim 3 in which said method includes selecting titanium as the workpiece and providing coolant flow through the ends of the end mill while cutting.

* * * * *